United States Patent Office 3,223,603
Patented Dec. 14, 1965

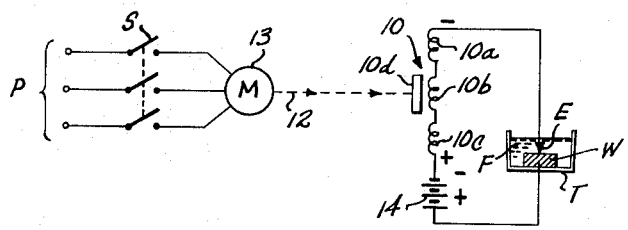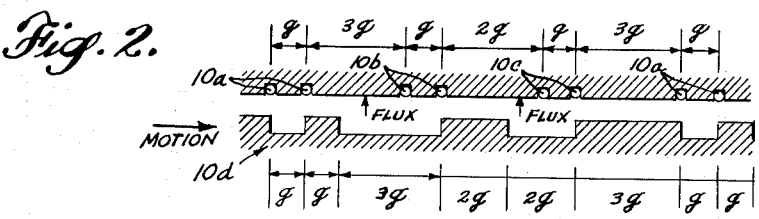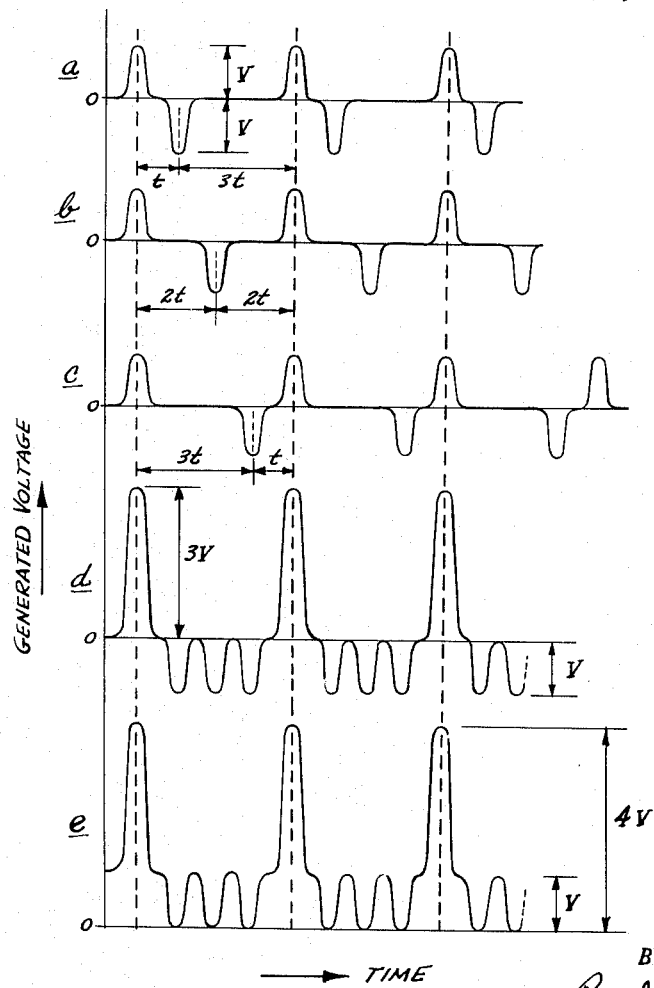

3,223,603
MACHINING BY COMBINED SPARK DISCHARGE
AND ELECTROLYTIC ACTION
Kiyoshi Inoue, 182 Yoga Tamagawa Setagaya-ku,
Tokyo, Japan
Filed Apr. 4, 1960, Ser. No. 19,685
1 Claim. (Cl. 204—143)

This invention relates to improvements in the art of metal removal by electric means and more particularly concerns novel apparatus and methods of this type which are commercially more feasible than previous proposals. The invention is herein illustratively described by reference to the presently preferred embodiments thereof, however, it will be recognized that certain modifications and changes therein with respect to details may be made without departing from the underlying essentials involved.

Certain features of the present disclosure are to be found in earlier-filed applications of the present applicant, Serial No. 765,616, filed October 6, 1958, now abandoned, entitled Electrolytic Machining Process and Apparatus; Serial No. 813,759, filed May 18, 1959, now U.S. Patent No. 3,098,164, entitled Unidirectional Impulse Electric Spark Discharge Machining Method and Apparatus; and Serial No. 712,349, filed January 31, 1958, entitled Electric Spark Machining Apparatus, since issued on February 9, 1960, as Patent No. 2,924,751. Reference is hereby made to those applications for background information pertinent to the present case.

In general, metal removal or machining by an electrical impulse method, most important of which is the spark discharge method performed in a dielectric fluid, may be developed for obtaining large removal rates in applications not requiring a fine surface finish, or in those for which the added cost of fine surface finishing as a separately implemented procedure is justified. No single process of the electrical discharge type has yet been developed which provides maximum machining speed with fine surface finishes. Where fine finishes are required in a single process, machining speed has necessarily been reduced to unsatisfactorily low values.

Perhaps the finest finishes obtainable at speeds which are not the highest but which are reasonably great are those obtained by an electrolytic machining process such as that disclosed in the above-cited application Serial No. 765,616 of pertinent title. Thus, in order to obtain a finished product in minimum time it was heretofore proposed that basic rough, rapid machining operations should be performed by apparatus such as that disclosed in the above-cited application Serial No. 813,759, whereupon the work-piece could be removed and set up in electrolytic machining apparatus for the finishing operations. However, such a procedure, while workable, has certain drawbacks including the practical difficulties and time loss in removing the work-piece from one machine and setting it up accurately in the other machine, the cost of procuring and operating two separate machines, the additional floor space required for an additional machine, and related disadvantages flowing generally from a two-step operation requiring separate and distinct machines for the two steps. Nor would these difficulties be overcome by providing a single large machine having within it the two separate work supports and associated components operated independently in sequence.

A broad object of the present invention is to enable machining a work-piece rapidly and with fine ultimate surface finishes without transferring it from one machine to another. Moreover, the same immersant container may be used, the same electrode, and the same positional relationship thereof with the work. Time is thereby saved and work of greater precision, with less chance for error, made possible.

While impulse-current is used for rough-machining, and direct current for final-finishing, the present invention combines the two types of supplies in such manner that the power from one augments that from the other during rough-machining, thereby increasing machining speed and the total duty time of power supply apparatus. Despite the combining of supplies for rough-machining, the transition to finish-machining is made possible without necessity for expensive switch-gear of high-current capacity.

Another object is to provide a combined power supply machining apparatus in which the final finish attained may be selected independently of the rate of metal removal attained during rough-machining.

A further object is to eliminate the necessity for rectifier means to prevent reverse-current flow in the discharge circuit caused by negative impulses which the impulse supply generates incidental to its generation of positive machining impulses.

A further object is to limit short-circuit current between the electrode and work-piece, thereby avoiding arc damage to the work and overloading of current supplies.

In accordance with this invention as herein disclosed, the output windings of a discharge-machining dynamo-electric unidirectional impulse generator, such as one of the type disclosed in the above-cited application Serial No. 813,759, are connected serially with the electrode and work-piece and with an electrolytic-machining direct-voltage supply, with the output voltage of the direct-voltage supply being substantially equal to the negative impulse peak voltages incidental to the operation of the impulse generator in delivering its positive discharge-machining impulses. By this means the effective amplitude of the machining impulses applied to the work-piece and electrode are increased by the magnitude of voltage of the electrolytic supply during rapid machining operations and the necessity for rectifier devices preventing reverse current flow between the electrode and work-piece during the negative impulse cycles of the dynamo-electric machine is altogether avoided, yet it is found that the presence of direct voltage of this order of magnitude does not create an arcing problem. Moreover, electrolytic fine-finishing is initiated and performed, after completion of the rough and rapid metal removal phase, simply by rendering the dynamo-electric machine inoperative and without necessity of disconnecting its output windings from its series circut connection with the electrolytic supply and the electrode-work-piece load.

In one embodiment the electrolytic direct-current supply may comprise a dynamo-electric direct-current generator driven by the same motor as that which drives the dynamo-electric machining impulse generator, with suitable clutching and de-clutching means interposed in the connection so as to permit conveniently rendering the latter inoperative during the electrolytic machining phase. In another embodiment, involving an electrolytic supply of the rectifier type, additional rectifier means may be connected in shunt to the direct-voltage-producing rectifiers as a means to help carry the high-amplitude impulses from the dynamo-electric impulse generator, whereby relatively small-capacity inexpensive rectifiers may be used in the electrolytic supply. In still another embodiment, likewise preferably involving use of rectifiers in the electrolytic supply, alternating-voltage amplitude applied to these rectifiers is regulated in accordance with variations in load voltage occurring between the electrode and work-piece, and preferably the output voltage of the dynamo-electric impulse generator is correspondingly regulated by varying the excitation of such dynamo-electric machine in accordance with the output voltage of the electrolytic supply rectifier means.

These and other features, objects and advantages of the invention will become more fully evident from the following description thereof by reference to the accompanying drawings.

FIGURE 1 is a simplified schematic diagram of the novel apparatus in a basic form.

FIGURE 2 is a diagrammatic illustration of one form of salient-pole dynamo-electric unidirectional impulse generator applicable to the circuit shown in FIGURE 1.

FIGURE 3 is a voltage wave diagram illustrating the circuit operation in FIGURE 1 employing the generator depicted in FIGURE 2.

Figure 4:
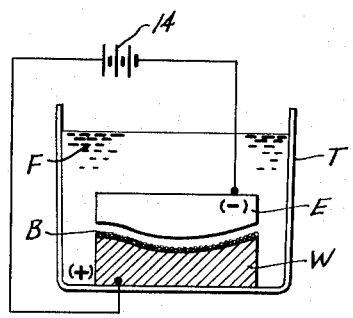
FIGURE 4 is a simplified diagram of an electrolytic machining apparatus depicting one operational phase of the circuit of FIGURE 1.

Referring to FIGURE 1, the work-piece W is immersed in suitable impulse discharge machining fluid F in a tank suitably adapted to support the work-piece W in cooperative positional relationship with the discharge electrode E. Voltage impulses producing spark discharge machining action in this example are delivered by the series-connected stator coils 10a, 10b and 10c of the rotary dynamo-electric unidirectional impulse generator 10. The rotor 10d of this generator, which rotor in this case comprises a salient-pole permanent magnet, is mechanically connected through coupling 12 to be driven by the three-phase electric motor 13 energizable from the source terminals P through a master control switch S. The indicated polarity of the generated impulses applied across the spark discharge gap between the work piece W and electrode E is such that the work-piece becomes the positive pole and the machining electrode tool the negative pole. For a purpose to be described direct-voltage source 14 is serially connected with the indicated polarity (making the work-piece W positive and the electrode E negative) in the discharge circuit comprising the generator windings and the electrode-work-piece discharge cell.

While various impulse sources could be used, suitable dynamo-electric unidirectional impulse generators for use as the generator 10 in FIGURE 1 are disclosed in the above-cited application, Serial No. 813,759 filed May 18, 1959. In FIGURE 2 one of those generators has been depicted in a diagrammatic form and in FIGURE 3 the first three wave diagrams a, b and c represent the respective voltage impulses generated by the separate stator windings 10a, 10b and 10c, whereas the fourth wave diagram d represents the composite or resultant wave form produced by the series-connected stator coils. Inasmuch as the details of construction and operation of such an impulse generator are disclosed in the aforesaid patent application, their repetition herein is unnecessary. FIGURE 2 includes sufficient information through the use of dimensional indications, in terms of the width and spacing module g, to reveal the manner in which, through the relative peripheral widths and spacings of the armature salient poles and the related widths and spacings of the stator coils, the individual coil impulses are caused to be spaced in time and thereby to combine in the manner shown in the resultant wave diagram d in FIGURE 3. In this latter diagram it will be observed that the periodic machining impulses shown to be of positive polarity occur at three times the amplitude of the individual coil impulses and that between each two succeeding positive impulses there are three incidental negative impulses, equally spaced in time, of one-third the amplitude of the positive impulses. It has been the practice, because of well known problems created by reverse or anti-machining current flow, to permit only the positive impulses to appear in the circuit connected serially with the electrode and work-piece, this exclusion of negative current flow being effected normally by use of series rectifier means polarized to eliminate the negative flow. Such rectifiers are rather expensive, however, because of the large current capacity required of them.

In the present circuit use of such a separate anti-machining current rectifier means is made unnecessary inasmuch as the direct-voltage source 14 is chosen to present a direct-voltage V which is equal in value to the peak amplitude of the negative impulses appearing in diagram d. Not only does the direct-voltage source 14 eliminate the requirement of a rectifier for that purpose, but it serves to boost the amplitude and thereby the energy content of the positive impulses producing the rapid spark discharge machining action. Although the voltage V of source 14 is only approximately one-third that of the positive impulses delivered by the combined stator coils of generator 10, so that the amplitude of the positive impulses is increased by only one-third, the energy content of the impulses, and thereby the work done, is more greatly increased because of the square-law relationship between voltage and energy or power. In effect, the impulse energy available for rapid machining is substantially doubled by this means.

It will be observed that the voltage does not return to zero and remain at zero during the entire interval between the positive discharge impulses producing the metal removal action. Instead there are two impulses of positive polarity and of amplitude V occurring during this interval as a result of the addition of the direct voltage V to the output of the impulse generator 10. However, these two impulses of low amplitude do not materially impair the principal function of the time delay occurring between the machining impulses, which is to permit complete de-ionization of the spark discharge gap so as to avoid continuous arcing, inasmuch as their amplitude is insufficient to prevent de-ionization in that period.

After the rough-machining phase of the total operation has been completed and final finishing is desired, in accordance with this invention, the dielectric liquid or other machining fluid F contained in tank T is replaced by an electrolyte, such as the salt solution disclosed in the above-cited application Serial No. 765,616 filed October 6, 1958. Leaving the same electrode E and the same positional relationship between electrode E and work-piece W, the switch S is then opened, thereby terminating impulse operation of generator 10. Direct-voltage source 14 remains serially connected with the generator windings 10a, 10b and 10c and with the electrode E and work-ipece W. The winding resistances are quite low, however, so that substantially the full voltage of source 14 is applied between the electrode and work-piece in the electrolytic cell comprising these components and the electrolyte F. Preferably the electrolyte is forceably circulated between the electrode and work piece in accordance with the teachings of the last-mentioned patent application, with the result that a relatively rapid and efficient fine-finishing operation is performed electrolytically on the work-piece W as desired.

It will be noted that no switching of heavy currents is necessary in the transition from rough-machining to fine-finishing operation of the apparatus, and that the presence of the stator coils of the generator 10 in series with the electrolytic source 14 presents no disadvantage. Typically the electrolyzing current delivered by the source 14 is of the order of a few hundred amperes and higher, whereas the peak impulse current delivered during the spark discharge machining phase may be as high as 600 amperes or greater. Thus, the elimination of a necessity for switching and for rectification in the circuit is a very important advantage from the engineering, as well as from the economic standpoint. On the other hand, the presence of the electrolytic source 14 in series with the impulse discharge source 10 during the rough-machining operation offers important and distinctive advantages in terms of efficient utilization of the two sources, the increased rate of metal removal obtained, the avoidance of the previous necessity for a rectifier eliminating the negative impulses at the work-piece and the opportunity for using the same electrode E for both phases of operation and thereby the avoidance of any necessity for shifting the work-piece from one tank to another, or realigning electrode and work-piece, or otherwise of disturbing an operational setup which often is precisely gauged with tolerances of ten thousandths of an inch or even less.

Figure 5:
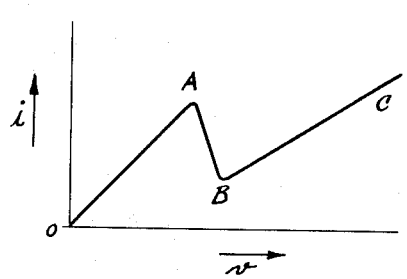
FIGURE 5 is a voltage-current diagram illustrating the operation of the electrolytic apparatus in FIGURE 4.

In FIGURE 4 the schematic illustration in simplified form depicts the relationship of the electrode E and work-piece W for the electrolytic finishing operation. With a sodium chloride electrolyte solution, as voltage is applied and increased, initially the current and voltage relationship follows Ohm's law, and positive sodium ions migrate to the negative electrode whereas negative chlorine ions are attracted to the positive work-piece. Chlorine molecules are formed at the surface of the work-piece and when voltage reaches a certain value (point A in FIGURE 5), the accumulating chlorine gas sheathing of the work-piece finally causes a decrease of current $i$ as voltage $v$ is further increased, until point B is reached. At point B further increases in voltage cause increased localized piercing of the gaseous shield so that current again increases with rising voltage. At the points of current flow to the surface of the work-piece, the current density is presumed to be very high. Studies indicate that these points of localized discharge occur in a vast number of locations and that these locations are continuously shifting. The effects seem to be that of localized discharge machining current flow in a myriad of shifting locations, which continuously disrupt the gaseous film at the many points of flow, and that while this occurs the thickness of the gaseous film in different areas varies in a random manner. The work-piece surface becomes rapidly heated. Because of temperature rise, a portion of the total quantity of chlorine ions becomes highly activated at the surface, to produce a progressive erosion of the work-piece chemically. As a result of the combined effects, a very smooth surface is obtained of the order of 1 to 5 microns variation in surface level between the microscopic peaks and depressions of any irregularities that remain. This surface is equivalent to a mirror finish.

Figure 6:
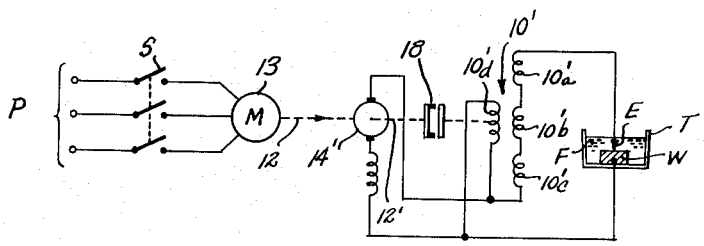
FIGURE 6 is a simplified schematic diagram of a modified machining apparatus.

In FIGURE 6 the battery source 14 (FIGURE 1) is replaced by a direct-current generator 14' of the series type. The generator rotor is driven by motor 13 through the direct mechanical coupling 12, and thus provides a source of direct voltage of relatively high-current capacity compared with the capacity of a commercially feasible battery source 14 as in the preceding embodiment.

Another revision, comparing FIGURE 6 with FIGURE 1, is the substitution of an electromagnetic coil-type rotor 10'd for the permanent magnet type 10d. The rotor coil 10'd in this instance is connected across the output terminals of the direct-current generator 14' and is rotated through an extension 12' of coupling shaft 12, in which extension a manually or automatically controlled clutch 18 is interposed. During the initial rough-machining phase of operation, the plates of clutch 18 are engaged so that the impulse generator 10' is operated simultaneously with the operation of the direct-current generator 14'. Under these conditions the system functions identically to the system shown in FIGURE 1. However, in order to transfer the operation from the rough-machining phase to the finishing phase, switch S remains closed and clutch 18 is disengaged, so that the impulse generator 10' is rendered inoperative whereas the direct-current generator 14' remains operative. As in the preceding instance, the discharge machining fluid F is replaced by a suitable electrolyte in order to complete the electrolytic machining process imparting the required fine polish to the work-piece.

Figure 7:
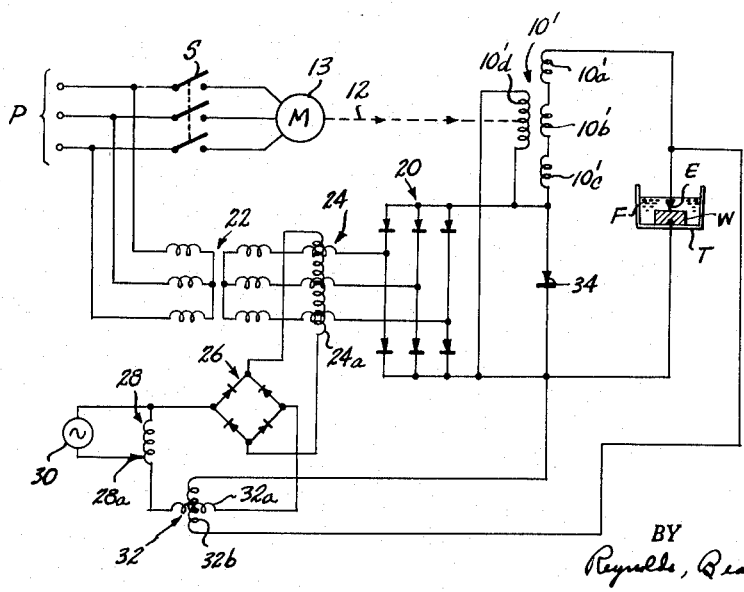
FIGURE 7 is a schematic diagram of a further modified embodiment.

In FIGURE 7 parts which correspond to those shown in preceding figures bear similar reference numerals. In this modified embodiment the electrolytic direct-voltage source comprises a three-phase full-wave rectifier bank 20, comprising three pairs of serially connected rectifiers of like polarity, with the pairs combined in parallel, energized from the secondary of a star-connected three-phase transformer 22 through the reactance windings of a saturable reactor 24. The primary windings of transformer 22 are connected to the three-phase source of terminals P. The saturable reactor 24 has a control winding 24a energized by direct current produced in the rectifier bridge 26. Opposite terminals of winding 24a are connected to corresponding opposite points on the bridge, whereas energization of the bridge occurs through connections to the intermediate points from the output terminals of the auto-transformer 28 which is energized from the alternating-current stource 30. An adjustable wiper 28a in the auto-transformer provides variability in the magnitude of bias current caused to flow through the control winding 24a. The reactance winding 32a of the saturable reactor 32 is interposed in the connections between the auto-transformer and the rectifier bridge. The control winding 32b of this saturable reactor is connected across the spark discharge gap, namely, by connections to the work-piece W and the electrode E, respectively, as shown. Connected in shunt across the pairs of rectifiers in the full-wave bank 20 is a by-pass rectifier 34 preferably of the dry type having a polarity, like that of the rectifiers in the bank 20, which assures that the work-piece W will be positive and the electrode E negative.

In the operation of the circuit shown in FIGURE 7, alternating voltage delivered by transformer 22 or its equivalent is rectified in the bank 20 and serves in the same capacity as the voltage delivered by direct-current generator 14' in FIGURE 6, namely, to energize the rotor winding 10'd of impulse generator 10' and as a means to augment the energy content of the spark discharge pulses produced in the rough-machining action on the work-piece W, as well as to eliminate the necessity for an anti-reverse current switch or rectifier in the electrode-work-piece leads which would otherwise be desirable to prevent reverse-current flow through the spark discharge gap caused by incidental negative impulses of the rotary impulse generator. As long as switch S remains closed, therefore, the work-piece is subjected to spark discharge action produced by the summation of the direct-current voltage and impulse voltage of the electrolytic and spark discharge sources, respectively, acting in concert. The magnitude of direct voltage delivered by rectifier bank 20 may be adjusted for such operation by establishing the setting of wiper 28a at the correct position, so that the system is operated substantially in accordance with the diagram labeled $e$ in FIGURE 3.

When the rough-machining operation is completed, switch S is opened and the impulse generator 10' is thereby rendered inoperative. At this time, upon replacement of dielectric fluid F in tank T with a salt solution, electrolytic processing occurs in order to impart the desired fine finish to the machined surfaces of the work-piece as a result of the sole action of the electrolytic power source comprising rectifier bank 20.

Rectifier 34 is placed in parallel with the rectifiers 20 in order to assume a substantial portion of the current-carrying requirement for the impulses delivered by the series windings 10'a, 10'b and 10'c of the impulse generator. This makes possible the use of rectifiers in bank 20 of smaller size than those otherwise required and thereby use of rectifiers of lower cost.

Adjustability in the setting of auto-transformer wiper 28a permits varying the rate of electrolytic machining and thereby the degree of finish or polish imparted to the work surfaces.

The circuit comprising the saturable reactor 32, with its reactance winding 32a and control winding 32b, provides protection against excessive current flow due to short-circuit conditions at the work-piece. At this point reference is made to my Patent No. 2,924,751 cited above. When a short circuit occurs, current flow, which would be damaging to transformer 22 and rectifier bank 20, is avoided as a result of the sudden drop of energizing voltage occurring across reactor control winding 32b. This voltage drop causes a marked increase in the reactance of reactance winding 32a and thereby a considerable decrease in the control or bias current flowing through control winding 24a of saturable reactor 24. Accordingly, there is a sudden increase in the reactance of the reactance winding of reactor 24 and a corresponding drop in the rectified direct voltage produced by the rectifier bank 20. This markedly reduces the D.-C. component of current flowing through the shorted electrode and work-piece. Moreover, because the impulse generator rotor coil 10'd is also energized from across the rectifier bank 20, there is a corresponding reduction of output voltage from the impulse generator. Thus, despite the short-circuit condition, excessive current flow in the transformer and in all of the rectifiers is prevented; moreover, damage to the work-piece is avoided. Once the short circuit is eliminated the entire apparatus returns to normal operation without any delay and in a fully automatic manner. It will be noted that this same short-circuit protection exists not only in the case of rough-machining operations involving the concerted action of both sources of voltage but that it also exists in the case of electrolytic machining involving only the single source comprising the rectifier bank 20.

It will be recognized that the discovery and useful application of a combined power source circuit with a common electrode-work-piece support arrangement in order to produce sequential rough-machining and fine-finishing operations in a single set-up of the electrode and work-piece and without necessity of any transitional interphase switching in the electric circuit in which the electrode and work-piece are connected has certain novel and unusual advantages not heretofore recognized and which make for a more commercially feasible and economical machining process. The apparatus costs less than former apparatus using these two processes, namely, rough machining and finish machining as functions implemented by separate and distinct apparatus, is more rapid and efficient in operation, and permits full-time duty of the electrolytic source during both rough and fine machining.

It has been mentioned that the principal application of the invention occurs in the case of the combination of spark discharge machining, as the rough machining method, and electrolytic machining as the final or finishing machining method. However, it will be recognized that other machining techniques may be used in lieu of those in the examples. For example, contact machining techniques, in which the surface of the metal work piece is ground by the combined action of mechanical friction and melting by contact current flow may be substituted for the discharge machining process. These and other aspects of the novel apparatus and method will be recognized by those skilled in the art, on the basis of the foregoing disclosure of the preferred embodiments and mode of operation.

I claim as my invention:

The process of electrical machining comprising the steps of mounting a machining electrode and a conductive workpiece in spaced relationship with a gap therebetween, providing a dielectric fluid in said gap, passing a series of unidirectional electrical impulses from a first source across said gap, simultaneously modulating said impulses by operatively connecting to said first source and the gap a second source of electrical impulses comprising unidirectional impulses of like polarity thereto with a plurality of intervening impulses of opposite polarity to provide a combined output of relatively high voltage impulses spaced by a plurality of like polarity impulses of relatively low voltage for rough machining operation, removing the dielectric fluid from the gap, providing an electrolyte fluid in said gap, disabling said second source and maintaining said first source operable for finish machining operation, and maintaining said electrode and workpiece in situ during rough and finish machining operations.

References Cited by the Examiner

UNITED STATES PATENTS

| | | | |
|---|---|---|---|
| 2,515,192 | 7/1950 | Chester | 204—228 |
| 2,526,423 | 10/1950 | Rudorff | 204—143 |
| 2,706,170 | 4/1955 | Marchese | 204—228 |
| 2,826,540 | 3/1958 | Keeleric | 204—143 |
| 2,987,609 | 6/1961 | Williams | 219—69 |

OTHER REFERENCES

Popilov "New Electro-Mechanical Methods for Cutting and Grinding of Metals in Laboratory Practice" Zavodskiya Laboratoriya, vol. 14, 1948, pages 358–361, No. 3.

WINSTON A. DOUGLAS, *Primary Examiner.*

JOHN H. MACK, JOHN R. SPECK, *Examiners.*